Nov. 21, 1967  E. H. T. BENSEMANN  3,353,670
SIZING MACHINE
Filed May 21, 1965  6 Sheets-Sheet 1
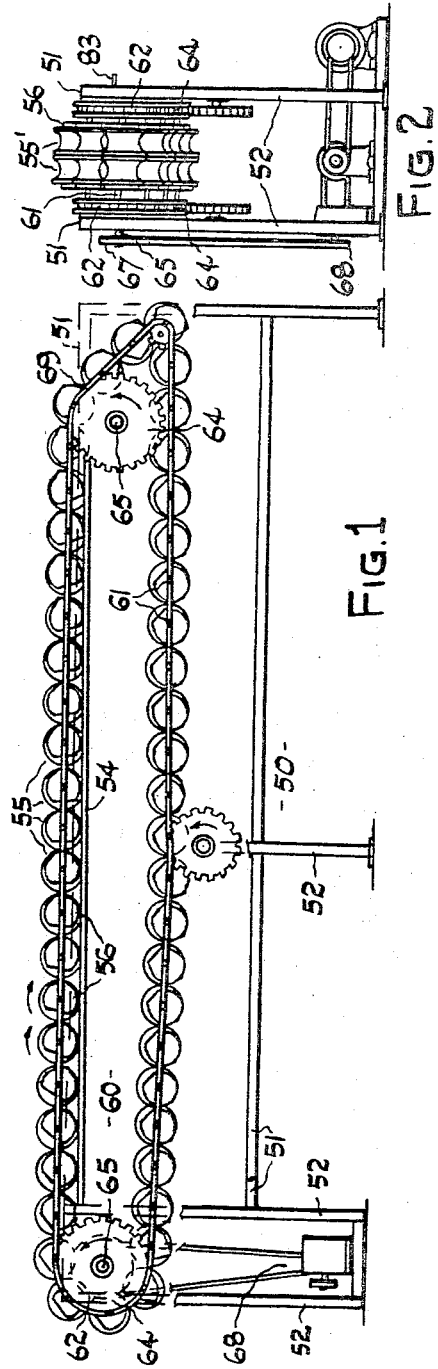
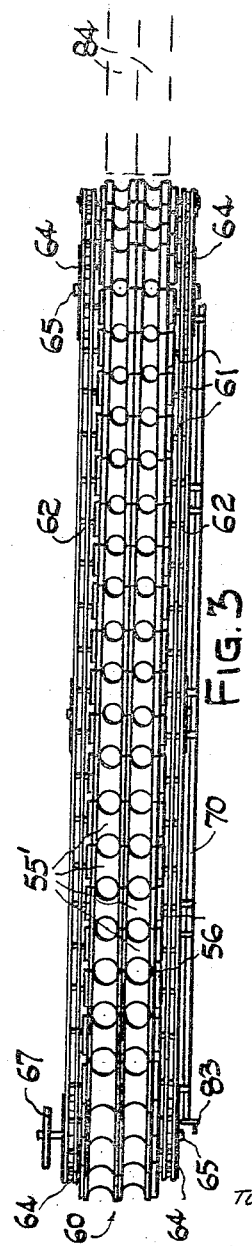
INVENTOR
EDWARD HANS
TUI BENSEMANN
By Young & Thompson
ATTORNEYS

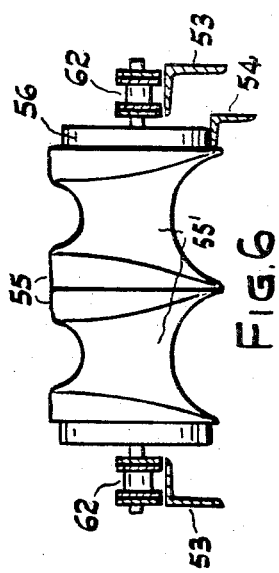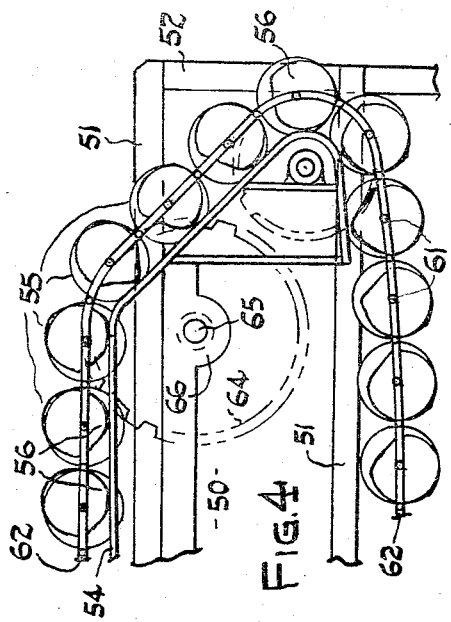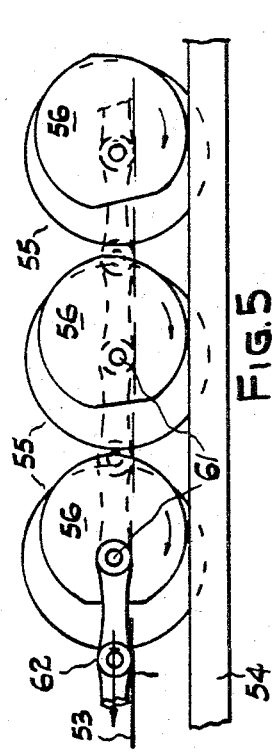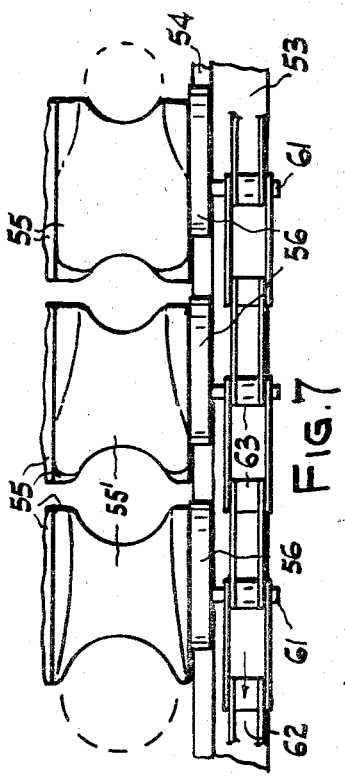

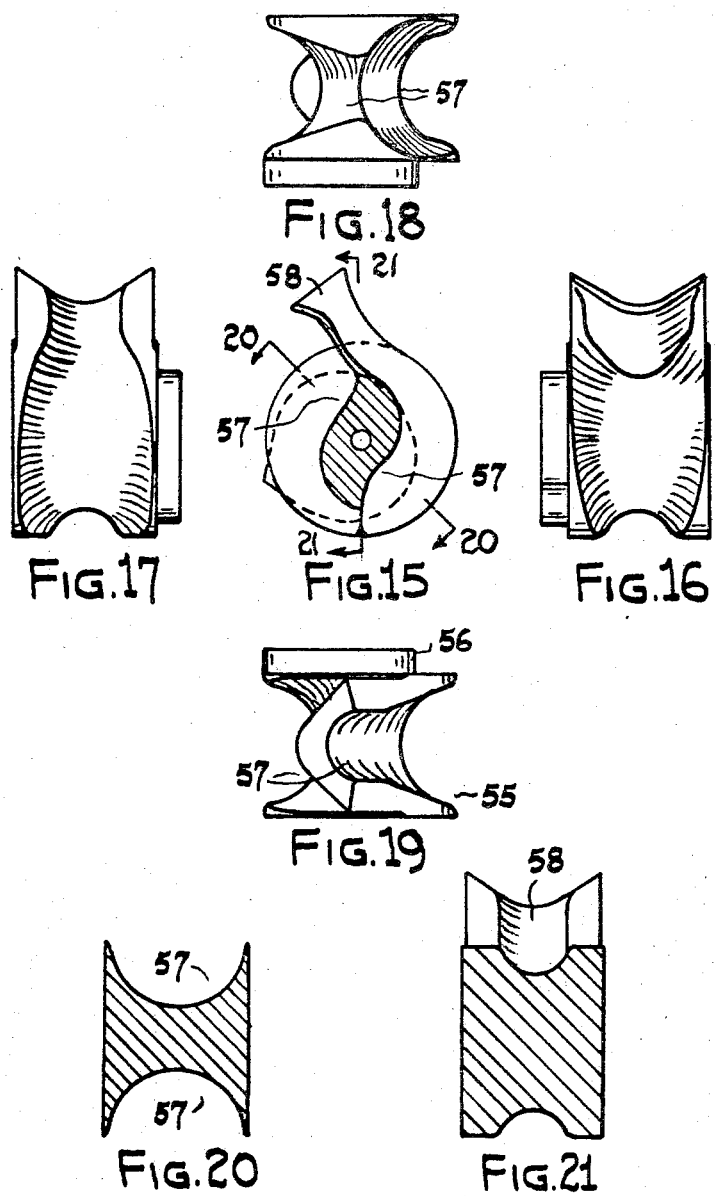

Nov. 21, 1967  E. H. T. BENSEMANN  3,353,670
SIZING MACHINE
Filed May 21, 1965  6 Sheets-Sheet 5
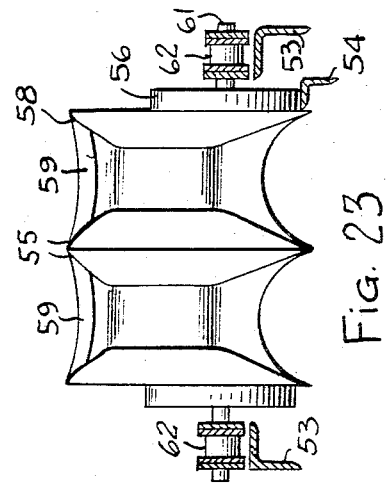
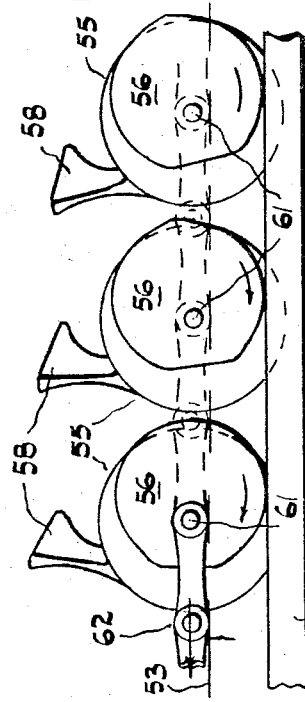
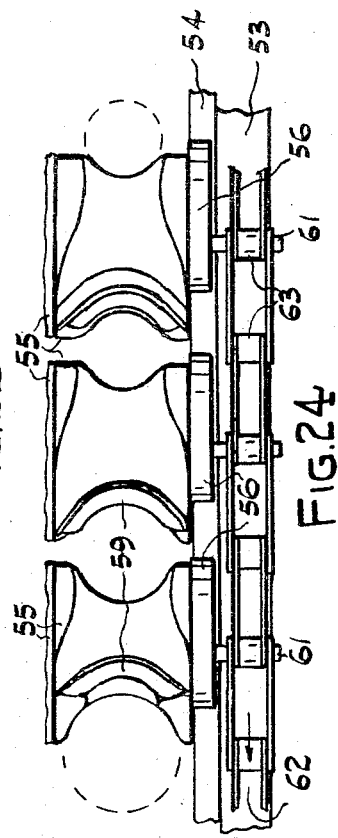
INVENTOR
EDWARD H. T. BENSEMANN
By Young & Thompson
ATTYS.

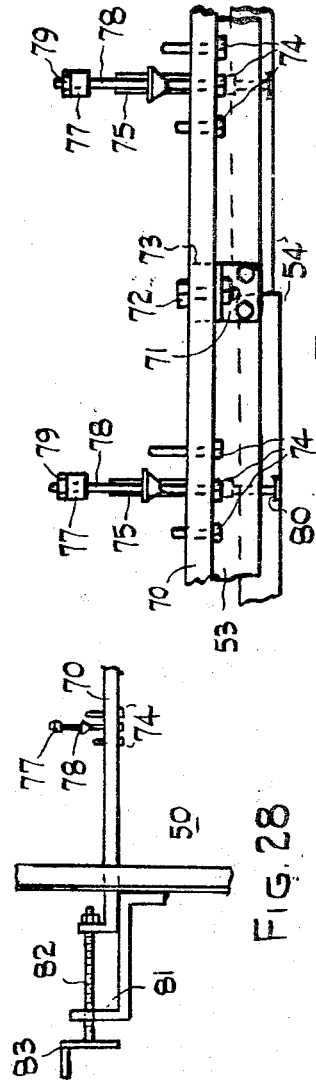
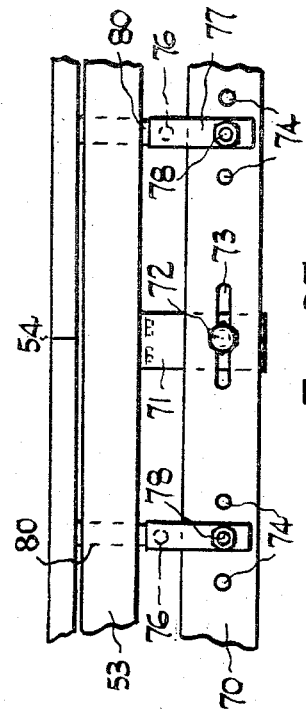
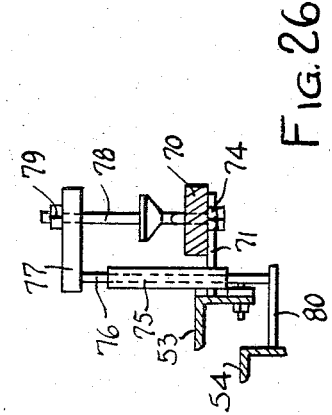

United States Patent Office 3,353,670
Patented Nov. 21, 1967

3,353,670
SIZING MACHINE
Edward Hans Tui Bensemann, % New Zealand Inventions Development Co. Ltd., 114 Taranaki St., Wellington, Wellington, New Zealand
Filed May 21, 1965, Ser. No. 457,711
Claims priority, application New Zealand, May 29, 1964, 138,326; Mar. 19, 1965, 141,061, 141,062
5 Claims. (Cl. 209—84)

This invention relates to improvements in machines designed for use in the sizing of various articles or commodities such as fruit.

Different kinds of sizing machines have been developed over the years, such as machines employing tapered rolls or screws provided increasingly sized openings between them. More recently machines have been proposed embodying belt tracks with brush-off roller units positioned at decreasing heights along the belt track so that the different sized articles such as apples are discharged at suitable points into bins. Whilst most of these machines generally functioned effectively, in many instances the fruit was inconspicuously bruised due to the traverse of the fruit in the particular type of machine, or again sizing was not always as efficient as desired. Further as different varieties of fruit, e.g. Granny Smith and Cox orange, have different means sizes, this type of machine has to be adjusted to suit, and where the machine is a double-sided one with say a dozen sizing points along each side, it becomes quite a task adjusting and setting each discharge unit manually.

The present invention is concerned with a new concept of sizing machine embodying an entirely different principle of sizing to that in present types of machines.

For one object the invention provides a machine for sizing articles such as fruit, the machine having such a construction that the sizing of the articles or fruit is effected in a positive and efficient manner without damage to the articles or fruit.

A further object of the invention is to provide a machine for sizing articles such as fruit, the machine including specially-shaped sizing spool members so that certain sized or shaped fruit such as pears will sit properly in openings between particular adjacent spool members for effective sizing operation.

A yet further object of the invention is to provide a machine for sizing articles such as fruit, the machine including means for adjusting and setting a number of articles or fruit sizing and/or discharging units of such a construction and/or arrangement that the units can be adjusted and set from one discharging size position to another in one operation.

Generally the invention consists of a machine for sizing articles such as fruit, the machine comprising a frame, an endless travelling band mounted to move within the frame and including a plurality of spool members, each member formed on its periphery with a groove, one part of the groove increasing in width and depth towards the start of the other part of the groove, means for moving the endless band within the frame and means for supporting an upper run of the band's members and providing for such members to have independent movement in a contradirection to that of the said upper run, whereby when an article is positioned between two members in the upper run and the members by rotating, a part of each of their respective grooves moves towards its wider and deeper end to provide an opening between the members of increasing size for the article to pass through such opening.

The invention further includes in such a machine as just described, each spool member provided with a lip projecting beyond the periphery of the member and located at the wider and deeper end of one part of the member's groove, the said lip being curved in its cross-section to suit and merge into the start of the other part of the groove, the construction and arrangement of two spool members being such that edges of the lip of one spool member will lie on the peripheral edges of the next spool member to form a cup for the opening between the spool members so that an article may be correctly positioned and held therein for subsequent sizing in further movement of the spool members.

The invention further includes in such a machine as just described, means for adjusting and setting discharging stations from one discharging size position to another position, comprising an actuating member carried on the machine and passing the said stations and at each station locality a device mounted on the member consisting of a plurality of different height regulating points and at each station a further device associated with one of the said points, the arrangement and construction being such that on a movement of the actuating member, another one of the points will be associated with the said devices whereby the stations are adjusted and set to another discharging size position for the articles.

The invention will be more fully described with reference to the accompanying exemplified, largely diagrammatic, drawings, in which:

FIGURE 1 is a side view of the machine with part of its upper structure removed, FIGURE 2 is a view at the drive end and FIGURE 3 is a plan of the machine;

FIGURE 4 is a side view, on an enlarged scale, of the driven end of the machine;

FIGURE 5 is a side view, on larger scale,

FIGURE 6 is an end view and

FIGURE 7 is a partial plan of three pairs of the spool members in the upper run of the machine;

FIGURES 15 to 21 are similar views to FIGURES 8 to 14 but with the cross sections taken on the lines 20—20 and 21—21 of a modified form of the spool member;

FIGURES 22 to 24 are similar views to FIGURES 5 to 7, with the modified form of the spool member;

FIGURE 25 is a side view, on enlarged scale,

FIGURE 26 is an end view and

FIGURE 27 is a plan of a slide bearing and near setting points for the actuating member; and FIGURE 28 is a side view, on reduced scale, of a winding means for the actuating member.

In giving effect to a preferred embodiment of the invention, the frame 50 is generally constructed of longitudinal members 51 supported on fixed uprights or legs 52. Several of the longitudinal members are braced a distance apart dependent on the width of the spool members. Other longitudinal members are of a right-angled section with their backs facing outward so that the member provide tracks 53 and 54.

Figure 11:
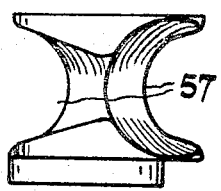
FIGURES 11, 12 are respectively an inverted plan and a plan of a form of the spool member.
Figure 10:
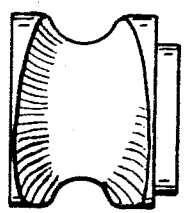
FIGURES 9, 10 are respective face views.
Figure 8:
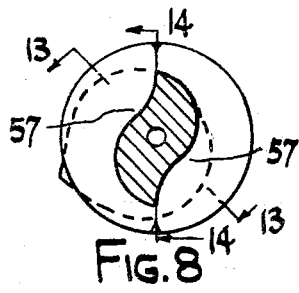
FIGURE 8 is a sectional side view.
Figure 9:
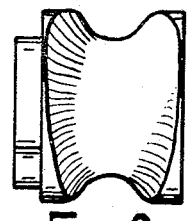
Figure 12:
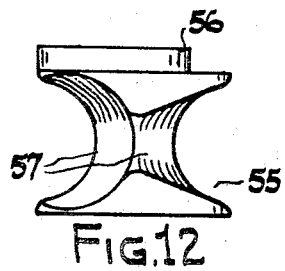
Figure 13:
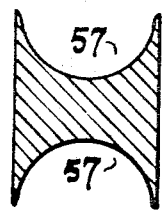
FIGURES 13, 14 are respectively cross sections taken on the lines 13—13 and 14—14 in FIGURE 8.
Figure 14:
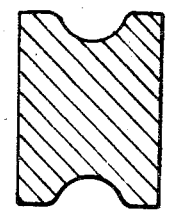

Each spool member 55 is moulded out of suitable material such as plastic or metal and of a width so that with a cam 56 fixed eccentrically to it, particularly as shown in FIGURE 5, the member fits easily between the longitudinal tracks 53 and the cam to sit on the particular track. The mean diameter of the spool member 55 is dependent on the largest size of the articles or fruit to be graded. This spool member 55 is formed with the groove 55' around its periphery, which groove is divided into two parts or halves 57. In relation to the direction of rotation of the spool member, each half 57 of the groove 55' constantly decreases in size, i.e. in width and depth towards the start of the other half of the peripheral groove. A form of the spool member is particularly illustrated by FIGURES 8 to 14 and a modification thereof is shown in FIGURES 15 to 21.

This modified form is moulded or provided with the lip 58. This lip 58 extends tangentially from the periphery of the spool member and has a width, similar to that of the first spool member, the lip's height or length from the spool periphery is about half its width but this is arbitrary.

The cross section of the lip 50 is concavo-convex and the inner curve constant with and merging into the start of one half 57 of the groove 55′. At the top of the lip 58, this curved shape flares out to the top edge and corners of the lip. This top transverse edge of the lip can have a strip 59 of soft material such as felt adhered to it so as not to bruise the fruit when rolling into the cup. The sides of the lip 58, in side view of the spool member, are curved to suit the diameter of such member.

In the formation of the endless band 60, each spool member 56 is freely mounted on a spindle 61 the ends of which are attached to links in sprocket chains 62 located at the respective sides of the spool members. These chains 62 are located so that in the upper run of the endless band 60 they will be supported yet move freely along the side tracks 53. The tracks can be of a width so that the chain rollers 63 run on such tracks.

The means for moving the endless band 60 consists of a pair of sprockets 64 located at each end of the frame 50 and carried on spindles 65 journalled in suitable bearings 66 positioned in the frame. One of these spindles has a gear, sprocket or pulley 67, coupled to a suitable driving means 68. Each sprocket chain 62 is positioned to run over the respective side sprockets 64 at that end of the frame.

Also provided in the frame 50 is the longitudinal track 54 that acts as a rail extending about the length of the frame but can be positioned below the level of the chain tracks 53 so that its depth therefrom gradually diminishes toward the other end of the machine. Alternatively this track rail 54 can be positioned above the level of the chain tracks 53 so that its depth therefrom gradually diminishes toward the other end of the machine. The sizing length of the rail is preferably divided into sectional lengths (see FIGURE 25) with a forward one, relative to movement of the upper run of the band, set slightly lower than the next one near each discharging station. On the side of the each spool member adjacent this rail 54, the eccentric cam 56 is affixed. This cam 56 is of a heart shape and can be weighted or spring-loaded to increase its effective engagement with the rail 54 for causing rotation of the particular spool member 55 and, due to the downward slope of the track toward the far end of the machine, will provide for such rotation to be gradual. A portional length 69 of the track-rail 54 slopes down towards one end—the fruit feed-in of the machine.

The actuating member consists of a shaft 70 having such a length that it extends past the various sizing and discharging units or stations positioned according to their working arrangement in the length of the machine. This line shaft 70 is slidably mounted in suitable bearings to part of the machine's frame such as the back of the angle-section of the chain track 53 at that side of the machine. Each bearing consists of an angle bracket 71 having one leg secured by bolts to the said track section and its other leg is tapped with a hole. A bolt 72 is screwed to this hole and passes easily through a longitudinal slot 73 suitably positioned in the length of the shaft 70; a nut is screwed onto the lower end of the bolt's shank to locate the bolt but not to stop the shaft 70 from sliding past the bolt 72. The length of each slot 74 is dependent upon the setting of the adjacent different height-regulating points.

These different height-regulating points are in the nature of bolts 74 screwed upwards through holes tapped in the shaft 70 near the adjacent ends of the sectional lengths of the rail 54. In this way the bolts 74 can be adjusted for the upper ends of their shanks to be set at different heights in relation to the axis of the actuating shaft 70.

Opposite each set of these height-regulating bolts 74, a vertical tubular guide 75 is mounted on a part of the machine's frame i.e. the back 53, of the adjacent chain track, and the further device is slidably mounted on such guide. This further member has a vertical bar 76 disposed easily through the bore of the guide 75 and an arm 77 attached to the top of the bar has its outer end tapped so that this hole is located over the line of the height-regulating bolts 74. In this tapped hole is threaded the shank of an inverted mushroom-headed screw 78 and a back-unit 79 is screwed on to the top end of the screw 78 projecting above the arm 77.

The lower end of the bar 76 has an arm 80 projecting inwards and is attached to the rail 54 upon which the cams 56 of the spool members 55 run. By an inclination of this rail 54 so is the setting of the spool members 55 determined to provide increasingly enlarged sizing and/or discharging openings preferably as earlier stated, this rail 54 consists of several sections so that by each section being associated with one of each of the height-regulating bolts 74 on the shaft 70, that section of the rail may be adjusted but dependent on which one of the bolts is engaged with the mushroom head of the screw 78. As previously indicated each of the bolts 74 may be individually adjusted for height.

At one end of the machine is affixed a tapped bearing 81 set in line with the shaft 70, a screwed stem 82 of a winding handle 83 is screwed through this hole with the other end of the stem suitably secured to the end of the shaft 70. By a winding of the stem 82 in one direction the shaft 70 is given a single linear movement to automatically move the sets of bolts 74 to another position for another one of the bolts to engage and lift, or allow, the vertical guide bar 76 to fall and so allow that section of the actuating rail 54 to have similar lift or fall movement.

For use, the outer end of the slanting portion of the machine is positioned adjacent the feed chute 84 of a fruit sorting or inspection table (not forming part of this invention) which is located at a suitable height for an operator standing at normal floor level.

With the machine operating, two adjacent spool members 55 of the upper run of and in line of travel of the endless band come up under the said chute 84 and a fruit unit rolls into the opening between such spool members which carry the fruit up the slanting rail portion 69 but without the spool members themselves then rotating. When the top of this rail portion 69 is reached the cams 56, due to their eccentric mounting (and weighting or spring-loading if applied), are caused to slide on the top of the sloping rail 54 in a direction opposite to rotary movement of the sprocket 64. In this movement, the opening between the two adjacent spool members 55 gradually increases in size due to the shaping of the particular mutual halves 57 of the grooves 55′ of the members. When the maximum-sized opening is provided to take the fruit unit, it falls through such opening.

Where the modified spool members 55 are employed the lip 58 of the leading spool member lies in the peripheral groove 55′ of the following spool member. On coming under the mouth of the chute 84 a fruit unit rolls into the opening or cup formed by the lip 58 and the start of that half of the groove. The felt strip 59 across the top of the lip 58 will stop the fruit bruising. As the eccentrically mounted cams 56 of the spool members 55 automatically set as they slide along the sloping rail 54 for sizing operation, the spool members gradually rotate in the contra-direction to that of the sprockets 64.

Whilst this specification sets forth in detail the present and preferred construction of the machine, still in practice such deviations from such detail may be resorted to as do not form a departure from the concept of the invention as defined by the appended claims. For instance, to suit a number of feed chutes, the width of the spool members can be increased and a similar member of peripheral grooves provided to suit the number of such chutes. Again a series of spool members can be provided on common spindles with suitably positioned moving sprocket chains and rails for cams on sides of the members. Again the rail may be made of a flexible nature so that it may be adjustably mounted at various fruit discharge stations along its length. In some instances the rail may slope the other way to that described above.

What is claimed is:

1. A machine for sizing articles such as fruit, comprising a frame, an endless member mounted to circulate within the frame, a plurality of spools carried by the endless member, each spool having a groove on its periphery, the groove of each spool being comprised of two halves in end-to-end relationship, each groove half increasing in width and depth peripherally from end to end thereof, from a shallow end to a deep end, the shallow end of one groove half being next to the deep end of the other groove half of the groove of each spool, adjacent spools having the same orientation relative to each other, means for circulating the endless member, and means for rotating the spools relative to the endless member with adjacent spools rotating in the same direction so that adjacent spools define between them an opening that progressively increases in size.

2. A machine as claimed in claim 1, each spool having a lip that projects outwardly beyond the periphery of the spool and has a forward surface having a shape that is a continuation of the general shape of the shallow end of one of the groove halves.

3. A machine as claimed in claim 2, the lip extending generally tangentially from the periphery of the spool.

4. A machine as claimed in claim 2, the lip extending beyond the periphery of the spool a distance which is about half the width of the lip.

5. A machine for sizing articles such as fruit, comprising a frame, an endless conveyor member mounted to circulate within the frame, a plurality of spools carried by the endless member, each spool having a groove on its periphery, each groove varying in width and depth progressively about the periphery of the spool, the spools being mounted for rotation about their axes on said endless member, an eccentric carried by each spool, and a track extending along the endless member and being disposed in nonparallel relationship with the endless member, the eccentrics engaging and following the track so as to rotate the spools at a peripheral velocity which is substantially less than the linear velocity of the endless member, the groove of each spool being comprised of two halves, each groove half increasing in width and depth peripherally from end to end thereof, from a shallow end to a deep end, the two halves of each groove being in end-to-end relationship and the shallow end of one groove half being next to the deep end of the other groove half of the groove of each spool, adjacent spools having the same orientation relative to each other, the direction of rotation of the spools relative to the endless member being such that adjacent spools define between them an opening that progressively increases in size as the eccentrics travel along the track.

References Cited

UNITED STATES PATENTS 2,353,941  7/1944  Stebler _____ 209—84

FOREIGN PATENTS 460,799  12/1950  Italy.

ROBERT B. REEVES, *Primary Examiner.*